US007000229B2

(12) United States Patent
Gere (10) Patent No.: US 7,000,229 B2
(45) Date of Patent: Feb. 14, 2006

(54) METHOD AND SYSTEM FOR LIVE OPERATING ENVIRONMENT UPGRADES (75) Inventor: Gary Gere, Emerald Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 503 days.

(21) Appl. No.: 10/202,783

(22) Filed: Jul. 24, 2002

(65) Prior Publication Data
US 2004/0019823 A1    Jan. 29, 2004

(51) Int. Cl.
G06F 9/44    (2006.01)

(52) U.S. Cl. ............... 717/169; 717/168; 717/170; 707/200; 707/203

(58) Field of Classification Search ............ 714/6, 714/13, 15; 717/168, 170, 169
See application file for complete search history.

(56) References Cited

U.S. PATENT DOCUMENTS

| 5,745,669 A * | 4/1998 | Hugard et al. ............ 714/3 |
| 5,764,992 A * | 6/1998 | Kullick et al. ............ 717/170 |
| 6,195,695 B1 * | 2/2001 | Cheston et al. ........... 709/221 |
| 6,351,850 B1 * | 2/2002 | van Gilluwe et al. ...... 717/175 |
| 6,594,723 B1 * | 7/2003 | Chapman et al. .......... 711/103 |
| 6,658,592 B1 * | 12/2003 | Cohen et al. ............. 714/6 |
| 6,684,396 B1 * | 1/2004 | Brittain et al. ........... 717/168 |
| 6,845,464 B1 * | 1/2005 | Gold .................... 714/6 |
| 2004/0199812 A1 * | 10/2004 | Earl et al. ............... 714/13 |

OTHER PUBLICATIONS

Microsoft, Microsoft Computer Dictionary, 2002, Microsoft Press, Fifth Edition, pp. 378 and 506.*

* cited by examiner

Primary Examiner—Scott Baderman
Assistant Examiner—Paul Contino
(74) Attorney, Agent, or Firm—Hickman Palermo Truong & Becker, LLP; Christopher J. Brokaw (57) ABSTRACT A method and system for implementing a live operating system upgrade of a computer system. The method includes generating a first copy of a previous operating system environment of the computer system. The computer system is then booted to a subsequent operating system environment. A second copy of the previous operating system environment at the time of the booting is then generated. Additionally, a third copy of the subsequent operating system environment, at the time of the booting is generated. The copies function by ensuring the subsequent operating system environment is synchronized with the previous operating system environment by comparing the first copy, the second copy, and the third copy to detect any intervening changes and allow decisions to be made regarding such changes.

21 Claims, 5 Drawing Sheets

METHOD AND SYSTEM FOR LIVE OPERATING ENVIRONMENT UPGRADES

FIELD OF THE INVENTION

The field of the present invention pertains to the backup and restoration of software applications executing on server computer systems. More particularly, the present invention relates to a method and system for ensuring the availability and integrity of a server operating system environment during upgrades and maintenance.

BACKGROUND OF THE INVENTION

Server computer systems are generally powerful computer systems configured for functioning in a network environment that is shared by multiple users. Servers come in all sizes from x86-based PCs to IBM mainframes. A server may have a keyboard, monitor and mouse directly attached, or one keyboard, monitor and mouse may connect to any number of servers (e.g., via a KVM switch). Servers may be also be primarily accessed remotely, for example, through a network connection. Example server implementations include application servers, database servers, mail servers, transaction servers, web servers, and the like.

A server operating system, or operating environment, comprises a primary mechanism through which servers implement their functionality. An operating system typically refers to a "master control program" that runs the computer system. The operating system is typically the first program loaded when the computer is turned on. In general, the main portion of the operating system, the "kernel," resides in memory at all times. The operating system sets the standards for all application programs that run in the server. The applications "talk to" the operating system for all user interface and file management operations. Also called an "executive" or "supervisor," a server operating system insures the multitasking functionality, whereby multiple programs are executed within the computer system at the same time. The number of programs that can be effectively multitasked depends on the type of multitasking performed (preemptive vs. cooperative), CPU speed and memory and disk capacity.

Generally, many programs can be run simultaneously in the computer because of the differences between I/O and processing speed. For example, while one program is waiting for input, instructions in another can be executed. During the milliseconds one program waits for data to be read from a disk, millions of instructions in another program can be executed. In interactive programs, thousands of instructions can be executed between each keystroke on the keyboard. In large computers, multiple I/O channels also allow for simultaneous I/O operations to take place. Multiple streams of data are being read and written at the exact same time. In the days of mainframes only, multitasking was called "multi-programming," and multitasking meant "multithreading." The primary operating systems in use are the many versions of Windows (95, 98, NT, ME, 2000, XP), the many versions of UNIX (Solaris, Linux, etc.), the Macintosh OS, IBM mainframe OS/390 and the AS/400's OS/400.

A problem exists due to the fact that all server operating system environments are vulnerable to failures that can cause data loss or corruption. Commercial server operating system environments (e.g., Solaris, UNIX, IRIX, etc.) typically provide a mechanism by which data may be restored in the event of a failure (e.g., during hardware/software upgrades, maintenance, etc.). Most commercial server operating system environments restore data by utilizing the most recent backup copy of the operating system environment in conjunction with a transaction log (e.g., ghost management software). In order to accomplish data restoration using a traditional rollback mechanism, the ghost management software typically utilizes backups of a full image of the operating system environment. A transaction log is a file that records all changes to user and system data since the last full image database backup. The transaction log captures the state of the operating system environment before and after changes are made.

Many prior art operating system environment reconstruction techniques restore the server operating system environment by using the most recent full image backup, or ghost. The server operating system environment is then "rolled forward" to a point in time, just prior to the time of the failure, by reapplying every transaction from each transaction log backup file saved since the last full image server operating system environment backup. This procedure effectively restores the server operating system environment to the state in which it existed just prior to the server operating system environment failure. One drawback of a roll-forward server operating system environment reconstruction is that all transactions that were started, and possibly completed, after the time of the failure are lost.

These traditional backup and recovery techniques are designed to protect data from hardware and media failures, such as disk crashes. In a typical server operating system environment, however, a more likely cause of data corruption is a user or application error. An incorrectly timed user program context switch or an application software error may inappropriately delete or modify data in the server operating system environment. Traditional restore and roll forward mechanisms are sub-optimal and inefficient for recovering data from such user or application errors.

Additionally, many causes of data corruption are due to incorrectly and partially applied operating system updates or changes. An incorrectly devised software program upgrade to one or more files of the operating system may lead to a software that may inappropriately delete or modify data in the server operating system environment. Traditional restore and roll forward mechanisms are inadequate for ensuring upgrades properly test and checkout, and alternatively, rolling back to the previous version in case of problems.

Furthermore, when the operating system environment is cloned, or otherwise imaged to create the ghost, the opportunity exists for data corruption between the time the current operating system environment is cloned, and when the cloned operating environment is booted upon a restart. The server applications must remain "live" as long as possible. Preferably, upgrades and maintenance is performed on a "hot swap" basis. Data may change on the current operating system environment before the cloned environment is activated, and those changes may not be reflected in the cloned environment. Also, in those cases where the cloned environment is brought live, changes may be made to the current, cloned, or both environments, resulting in inconsistent software state, confusing any traditional restore and roll forward mechanism.

Although some server operating system environments (e.g., Microsoft Windows NT Server, Sun Solaris, etc.) provide a recovery feature in which a "restore and roll forward" may be performed, to some extent such features mitigate the inefficiency of the prior art restore and roll forward methods described above, they are still not sufficient. Such methods cannot reliably function in the demanding, high availability, requirements of many server operating system environment applications.

Thus a need exists for a method and apparatus for restoring a server operating system environment that mitigates the inefficiencies of traditional roll forward techniques, while simultaneously allowing recovery of any intervening changes which may be implemented during any backup and restore process.

SUMMARY OF THE INVENTION

Embodiments of the present invention provide a method and apparatus for implementing a live upgrade of a server operating system environment, while simultaneously allowing recovery of any intervening changes which may be implemented during any backup and restore process. Embodiments of the present invention allow operating environment upgrades to be carried out dynamically, as server operating system is up and running, for example, handling transactions, serving files, and the like, while ensuring any problems with an upgrade can be safely recovered from.

In one embodiment, the present invention is a computer implemented method for dynamically implementing a live operating system upgrade of a server computer system, as the server computer system remains live and operating. The method includes generating a first copy of a previous operating system environment of the computer system. The computer system is then booted to a subsequent operating system environment. A second copy of the previous operating system environment at the time of the booting is then generated. Additionally, a third copy of the subsequent operating system environment, at the time of the booting is generated. The copies function by ensuring the subsequent operating system environment is synchronized with the previous operating system environment by comparing the first copy, the second copy, and the third copy to detect any intervening changes and allow decisions to be made regarding such changes.

In this manner, as the copies are being made and the updated operating system environment is being evaluated (e.g., for correctness, bugs, etc.), the previous operating system environment remains live and running on the server. The intervening changes to important data in the previous operating system environment can be evaluated by comparing the copies. Depending upon the differences between the copies, decisions can be made as to the disposition of any intervening changes. These decisions include, for example, updating the new operating environment, discarding the intervening changes, or declaring an error condition.

These and other advantages of the present invention will no doubt become evident to those of ordinary skill in the art after having read the following detailed description of the preferred embodiments which are illustrated in the various drawing figures.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide a method and apparatus for implementing a live upgrade of a server operating system environment, while simultaneously allowing recovery of any intervening changes which may be implemented during any backup and restore process. Embodiments of the present invention allow operating environment upgrades to be carried out dynamically, as server operating system is up and running, for example, handling transactions, serving files, and the like, while ensuring any problems with an upgrade can be safely recovered from.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "accessing" or "communicating" or "executing" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Figure 1:
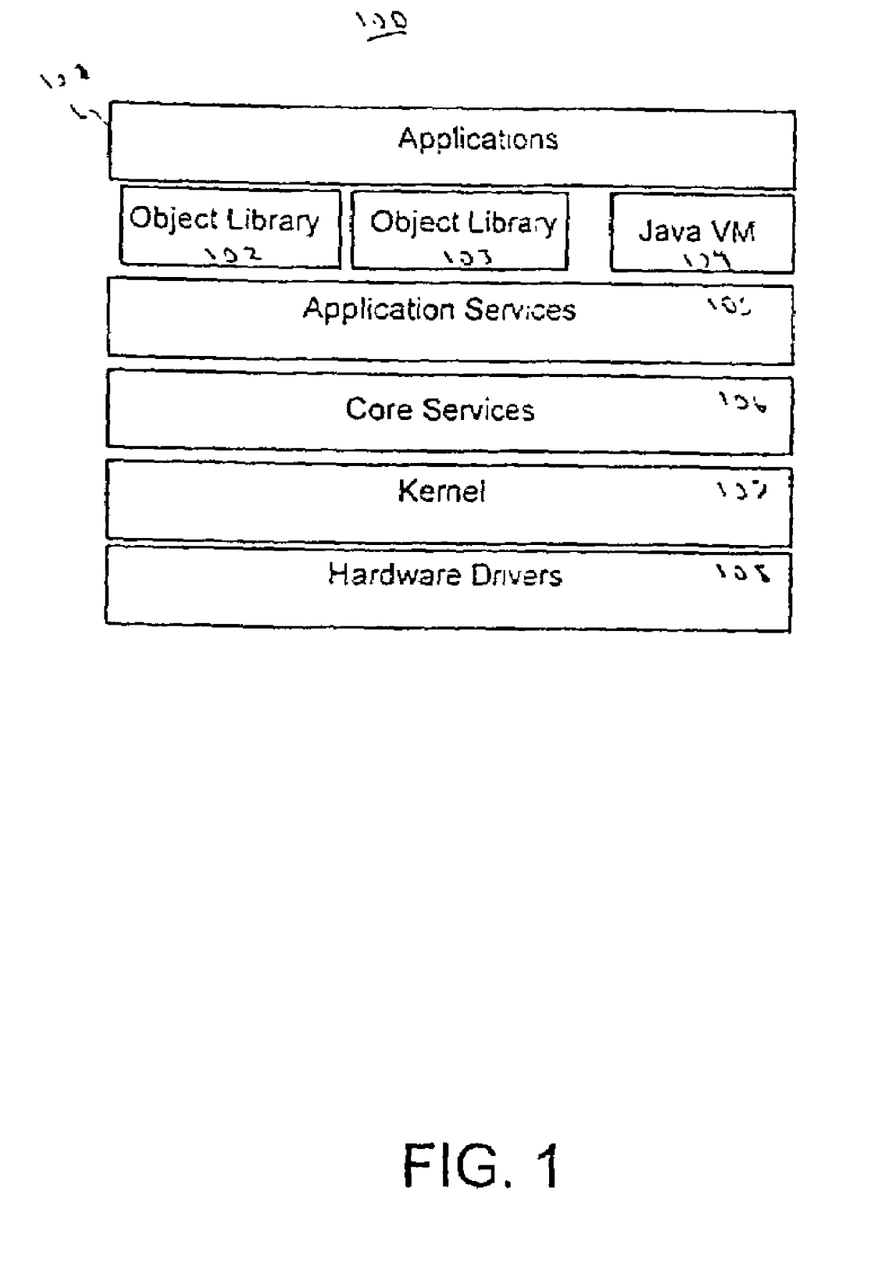
FIG. 1 shows a generalized overview diagram of an operating system environment in accordance with one embodiment of the present invention.

FIG. 1 shows a generalized overview diagram of an operating system environment 100 in accordance with one embodiment of the present invention. As depicted in FIG. 1, the operating system environment 100 includes an applications layer 101, object libraries 102 and 103, Java virtual machine 104, on top of an application services layer 105. The application services layer 105 resides on top of a core services layer 106. Each of these layers are serviced by a kernel 107. The kernel 107 interfaces with the hardware of the computer system via a hardware drivers layer 108.

Thus, FIG. 1 shows a common manner in which complex software architectures are visually depicted, wherein functionally distinct portions of a software architecture are separated out into "layers." As diagramed in FIG. 1, one layer sits on top of another, with the most fundamental layer on the bottom. The relationship between the layers of the diagram suggests the general interfaces and dependencies between the layers of software. For example, as depicted in system 100, the higher layers of software, which are the closest to actual application code, depend on the layer immediately under them, and that intermediate layer depends on an even lower layer.

It should be noted that system 100 as depicted in FIG. 1 is intended to depict a clarified view of the overall architecture of an operating system environment. Those skilled in the art will recognize simplifications inherent in the FIG. 1 depiction. The services and subsystems that one application uses, and how it uses them, can be very different from those used by another application, even one of a similar type. Dependencies and interfaces at the different levels can vary from program to program depending on individual requirements and realities. In one embodiment of the present invention, the operating system environment 100 is a Solaris™ operating system environment.

Figure 2:
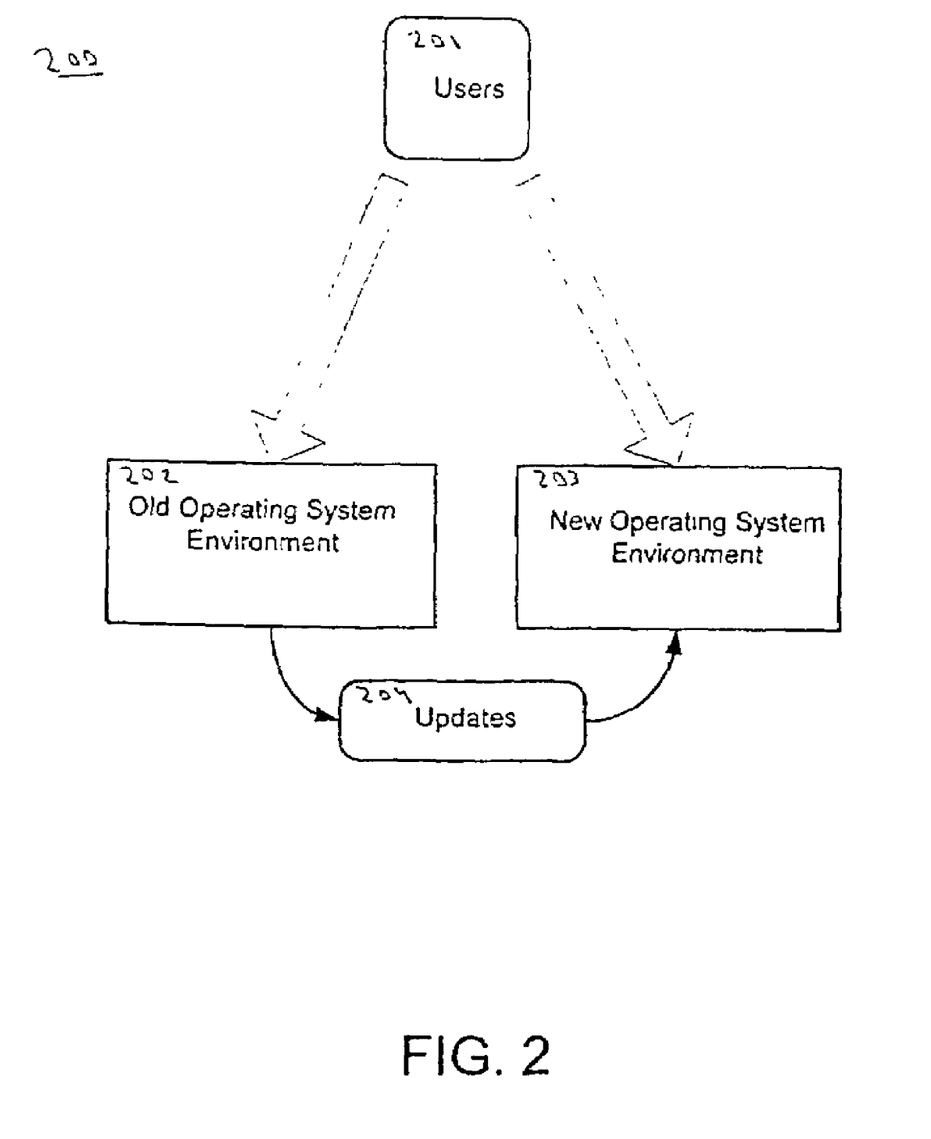
FIG. 2 shows a diagram of a live updating process in accordance with one embodiment of the present invention.

FIG. 2 shows a diagram of a live updating process in accordance with one embodiment of the present invention. As depicted in FIG. 2, a plurality of users 201 (e.g., application programs, the user transactions, user accesses, or the like) access the services provided by the server using at first, the old operating system environment 202. A primary objective is to keep the services provided by the server "live" and available to the users 201 to as great a degree as possible. Thus, the old operating system environment 202 is kept live until the updates 204 are applied to a copy of the old upgrade system environment (e.g., a ghost or image of the old upgrade system environment) to create a new operating system environment 203. This new operating system environment 203 is then tested and debugged. Once engineers are satisfied with the performance of the new operating system environment 203, the new operating system environment is brought live (e.g., booted) and the users 201 are transferred to the new operating system environment 203. The transition from the old operating system environment 202 to the new operating system environment 203 is intended to be as transparent as possible to the users 201.

Embodiments of the present invention provide backup and recovery techniques designed to protect data from hardware and media failures, such as disk crashes, which may occur during this transition from the old upgrade system environment 202 to the new operating system environment 203. Embodiments of the present invention protect against data corruption due to an improperly applied update or a user application error. For example, an incorrectly timed user program context switch or user application software error may inappropriately delete or modify data in the server operating system environment during this transition from the old operating system environment to the new operating system environment. Such intervening changes, if they represent errors, should be discarded. However, such intervening changes, if they represent the normal operation of the users 201 during the course of the transition from the old operating system environment to the new operating system environment, need to be captured and retained. Embodiments of the present invention provide a mechanism for analyzing and making intelligent decisions with regard to such intervening changes.

Figure 3:
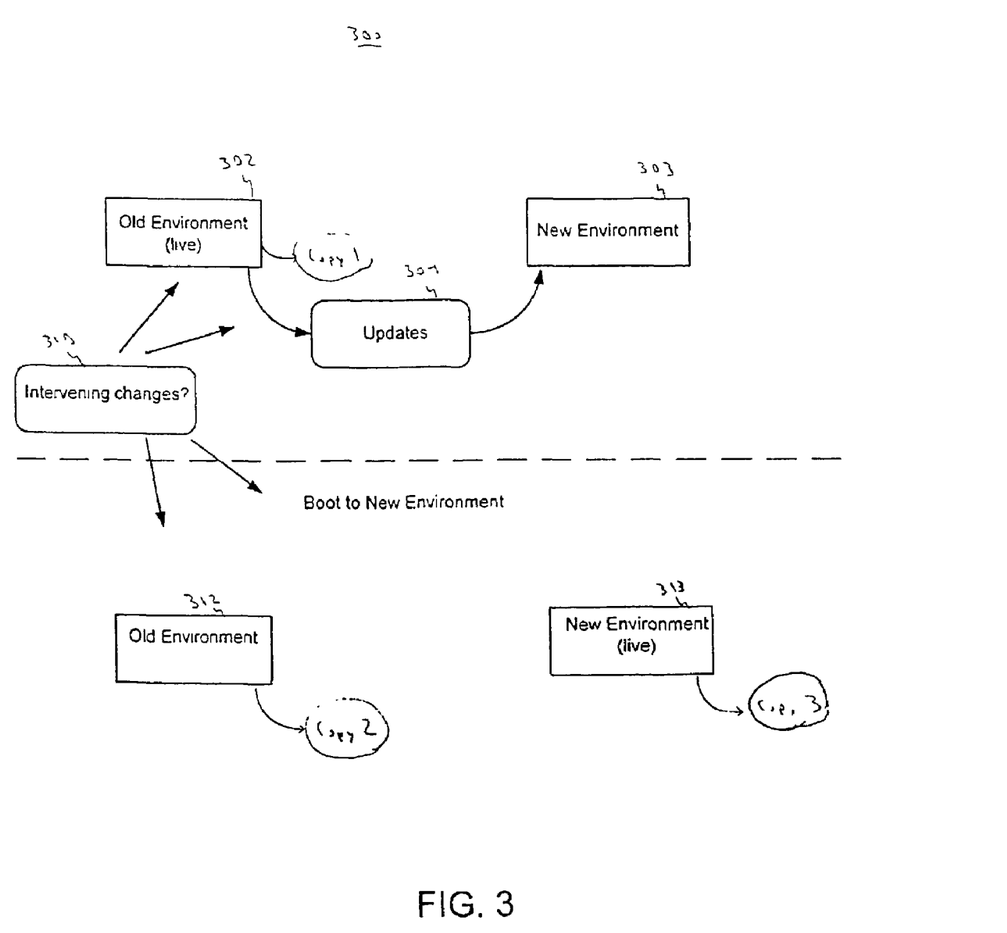
FIG. 3 shows a diagram of a live updating process in accordance with one embodiment of the present invention.

FIG. 3 shows a diagram of a live updating process 300 in accordance with one embodiment of the present invention. As depicted in FIG. 3, the state of the server is shown in a first state where an old operating environment 302 is live, and a second state where a new operating system environment 313 is live. The delineation between the first state and the second state is shown by the horizontal dotted line depicting a boot to the new operating system environment 313.

In the present embodiment, the old operating system environment 302 is kept live supporting users (e.g., users 201 shown in FIG. 2) as updates 304 are applied to the new operating system environment 303. As described above, the new operating system environment 303 is a copy (e.g., ghost) of the old operating system environment 302 with the updates 304 applied. In accordance with the present embodiment, the upgrade is live as the server computer system remains live and operating.

In the present embodiment, a copy (e.g., copy 1 as shown) is made of the old operating system environment 302 after the updates 304 have been applied to the new environment 303 and prior to booting to the new environment 313. The computer system is then booted to the new operating system environment 313.

At the moment of booting to the new operating environment 313, copies (e.g., copy 2 and copy 3 as shown) are made of the old operating system environment 312 and the new operating system environment 313. Once the new operating system environment 313 is booted, the new operating system environment 313 is live and supports the users.

In accordance with embodiments of the present invention, the copies (e.g., copies 1–3) function by ensuring the subsequent operating system environment (e.g., the new operating system environment 313) is synchronized with the previous operating system environment (e.g., the old operating system environment 302). The copies allow the detection of any intervening changes 310 due to the operation of user applications. Such intervening changes 310 include errors or corrupted data due to any problems with the operation of the user applications, updates of user passwords, updates of any user data which may occur during the transition from the old operating system environment 302 to the new operating system environment 313, or the like.

For example, comparing the copy of the old operating system environment 302 with the copy of the new operating system environment 303 (e.g., copy 1 vs. copy 3) enables the detection of whether the ghost imaging process for applying the updates 304 was correct. Comparing the copy of the old operating system environment 312 and the new operating system environment 313 (e.g., copy 2 vs. copy 3) enables the detection of intervening changes 310 which occurred during the transition. Intelligent decisions can then be made as to the disposition of such intervening changes.

For example, if there are changes in the old operating system environment 312 (copy 2) but not the new operating system environment 313 (copy 3) such changes can be interpreted as updates to the user information which occurred during the transition and boot process to the new environment 313, and copied to the new environment 313 accordingly. If there are changes in the new operating system environment 313 (copy 3) but not the old operating system environment 312 (copy 2) such changes can be interpreted as updates to the user information which occurred after the transition and boot process to the new environment 313, and can be ignored. Similarly, if there are no changes at all with either the old operating system environment 312 (copy 2) or the new operating system environment 313 (copy 3), an interpretation can be made that there were no intervening changes 310 and no action need be taken. In each case, changes to the old operating system environment 312 (copy 2) and the new operating system environment 313 (copy 3) are examined with respect to the copy of the old upgrade system environment 302 (copy 1) which was made prior to the boot to the new environment, as shown in FIG. 3.

In this manner, as the copies are made and the updated operating system environment is being evaluated (e.g., for correctness, bugs, etc.), the previous operating system environment remains live and running on the server. The intervening changes to important data in the previous operating system environment can be evaluated by comparing the copies. Depending upon the differences between the copies, decisions can be made as to the disposition of any intervening changes. These decisions include, for example, updating the new operating environment, discarding the intervening changes, or declaring an error condition.

It should be noted that copies can be made of only those files which are prone to being updated or changed by the user applications (user data files, etc.) to save storage space, time, and the like. For example, files which are prone to being changed or updated by user applications can be identified on a "synchronization list" and these files can be copied and used for the comparisons as described above. Additionally, it should be noted that a copy as referred to herein can be implemented as a unique representation of the data (e.g., parity check, hash, etc.) as opposed to a complete copy of the data.

Figure 4:
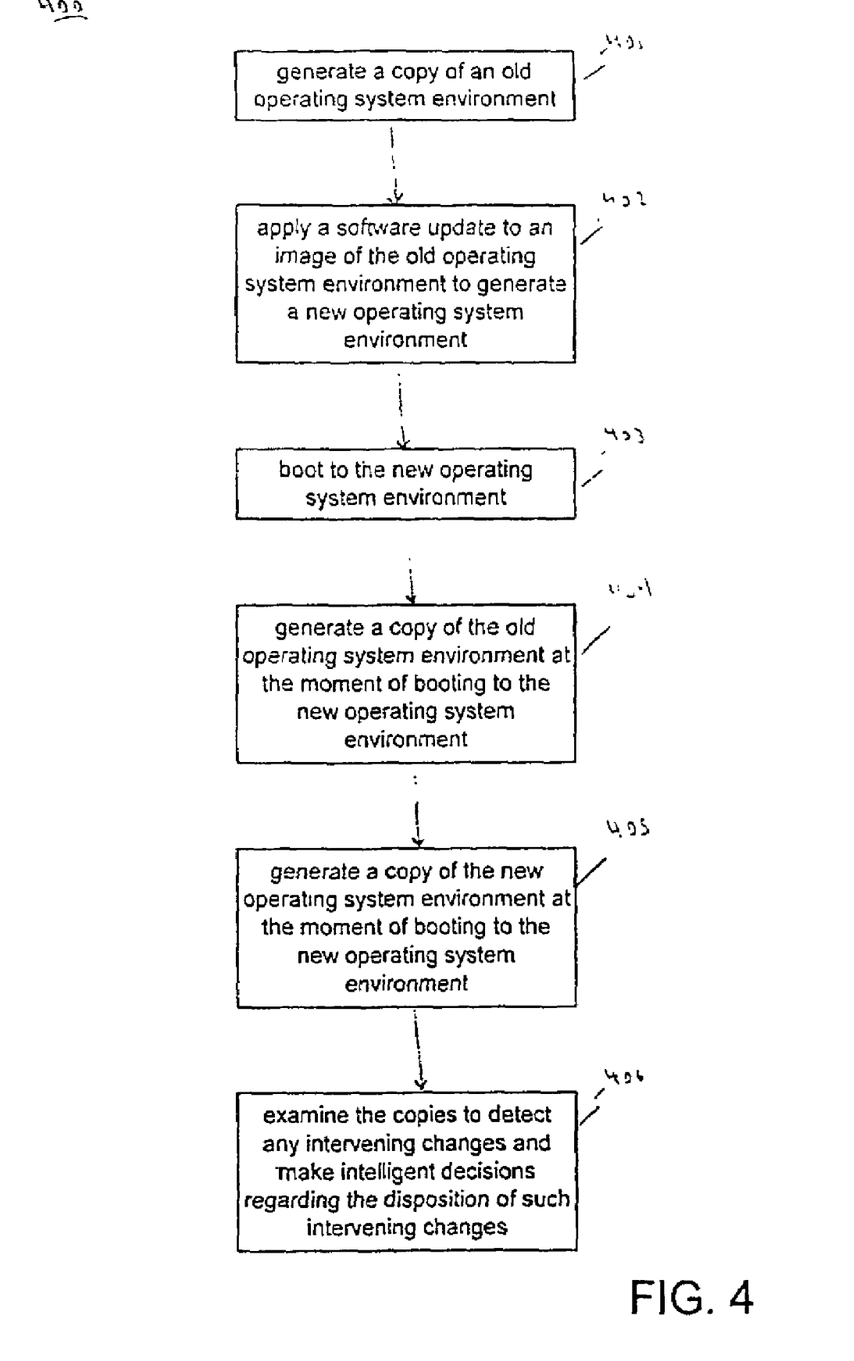
FIG. 4 a flowchart of a live updating process in accordance with one embodiment of the present invention is shown.

Referring now to FIG. 4, a flowchart of a live upgrade process 400 in accordance with one embodiment of the present invention is shown. FIG. 4 shows the steps involved in generating the copies used to examine intervening changes which may occur between a previous operating system environment and a subsequent operating system environment during a live upgrade.

FIG. 4 begins in step 401, where a copy of an old operating system environment (e.g., old environment 302 shown in FIG. 3) is generated. In step 402, a software update (e.g., update 304) is applied to an image of the old operating system environment to generate a new operating system environment (e.g., new environment 303). In step 403, the server computer system is booted to the new operating system environment. In step 404, a copy of the old operating system environment is generated at the moment of booting to the new operating system environment, as described above. In step 405, a copy of the new operating system environment is generated at the moment of booting to the new operating system environment, as described above. Subsequently, in step 406, the copies can be examined to detect any intervening changes and make intelligent decisions regarding the disposition of such intervening changes.

Computer System Platform

Figure 5:
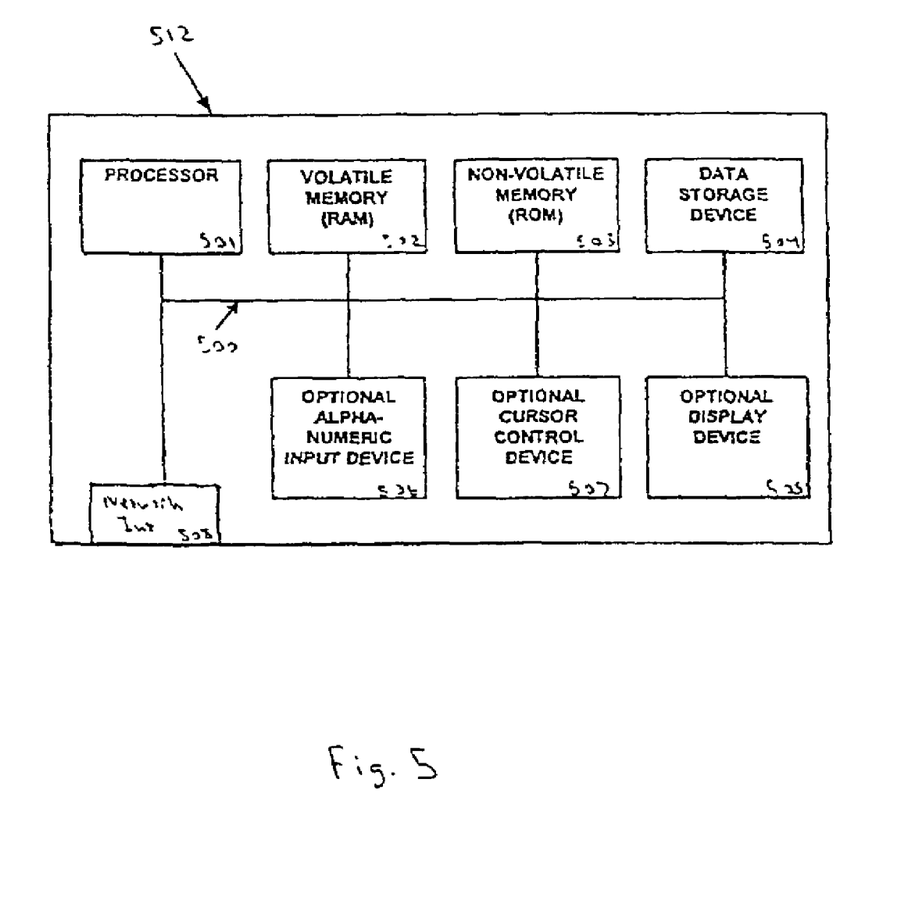
FIG. 5 shows the components of a computer system platform in accordance with one embodiment of the present invention.

With reference now to FIG. 5, a computer system 512 in accordance with one embodiment of the present invention is shown. Computer system 512 shows the components of a server computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit 503 (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a network interface device 508 coupled to the bus 500 for communicating with other computer systems on a coupled network.

Thus, embodiments of the present invention provide a method and apparatus for implementing a live upgrade of a server operating system environment, while simultaneously allowing recovery of any intervening changes which may be implemented during any backup and restore process. Embodiments of the present invention allow operating environment upgrades to be carried out dynamically, as server-operating system is up and running, for example, handling transactions, serving files, and the like, while ensuring any problems with an upgrade can be safely recovered from.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A machine-implemented method for updating an operating system environment, comprising:
   creating a copy of an existing operating system environment currently being executed by a machine;
   applying a set of updates to software code implementing the existing operating system environment to derive a new operating system environment;
   creating a copy of an altered operating system environment which includes changes made to the existing operating system environment after the copy of the existing operating system environment was created;
   creating a copy of the new operating system environment after the set of updates were applied;
   rebooting the machine to cause the machine to execute the new operating system environment;
   determining a set of changes that were made to the existing operating system environment, by a user application, to give rise to the altered operating system environment;
   comparing the copy of the altered operating system environment with the copy of the new operating system environment; and
   upon determining that the copy of the altered operating system environment comprises a set of intervening changes not reflected by the copy of the new operating system environment, changing the new operating system environment to reflect the set of intervening changes comprised in the copy of the altered operating system environment.

2. The method of claim 1, wherein the copy of the existing operating system environment, the copy of the altered operating system environment, and the copy of the new operating system environment are generated dynamically on the machine.

3. The method of claim 1, wherein the step of determining the set of changes comprises:
   comparing the copy of the existing operating system environment with the copy of the altered operating system environment; and
   generating the set of changes based on differences between the copy of the existing operating system environment and the copy of the altered operating system environment.

4. The method of claim 1, further comprising:
   adopting the copy of the new operating system environment if the copy of the new operating system environment reflects intervening changes with respect to the copy of the altered operating system environment.

5. The method of claim 1, further comprising:
   in response to comparing the copy of the altered operating system environment with the copy of the new operating system environment, determining that there are no intervening changes between the copy of the altered operating system environment and the copy of the new operating system environment.

6. The method of claim 1, further comprising:
   applying the set of changes to the new operating system environment.

7. A server configured to update an operating system environment, comprising:
   a computer system having a processor coupled to a memory, the memory having computer readable code which, when executed by the processor, causes the computer system to implement:
     creating a copy of an existing operating system environment currently being executed by the server;
     applying a set of updates to software code implementing the existing operating system environment to derive a new operating system environment;
     creating a copy of an altered operating system environment which includes changes made to the existing operating system environment after the copy of the existing operating system environment was created;
     creating a copy of the new operating system environment after the set of updates were applied;
     rebooting the server to cause the machine to execute the new operating system environment;
     determining a set of changes that were made to the existing operating system environment, by a user application, to give rise to the altered operating system environment;
     comparing the copy of the altered operating system environment with the copy of the new operating system environment; and
     upon determining that the copy of the altered operating system environment comprises a set of intervening changes not reflected by the copy of the new operating system environment, changing the new operating system environment to reflect the set of intervening changes comprised in the copy of the altered operating system environment.

8. The server of claim 7, wherein the copy of the existing operating system environment, the copy of the altered operating system environment, and the copy of the new operating system environment are generated dynamically on the server.

9. The server of claim 7, wherein the step of determining the set of changes comprises:
   comparing the copy of the existing operating system environment with the copy of the altered operating system environment; and
   generating the set of changes based on differences between the copy of the existing operating system environment and the copy of the altered operating system environment.

10. The server of claim 7, further comprising:
    adopting the copy of the new operating system environment if the copy of the new operating system environment reflects intervening changes with respect to the copy of the altered operating system environment.

11. The server of claim 7, further comprising:
    in response to comparing the copy of the altered operating system environment with the copy of the new operating system environment, determining that there are no intervening changes between the copy of the altered operating system environment and the copy of the new operating system environment.

12. The server of claim 7, further comprising:
    applying the set of changes to the new operating system environment.

13. A computer-readable medium storing computer readable code which, when executed by a computer system, cause the computer system to perform the following steps:
    creating a copy of an existing operating system environment currently being executed by the computer system;
    applying a set of updates to software code implementing the existing operating system environment to derive a new operating system environment;

creating a copy of an altered operating system environment which includes changes made to the existing operating system environment after the copy of the existing operating system environment was created;

creating a copy of the new operating system environment after the set of updates were applied;

rebooting the computer system to cause the machine to execute the new operating system environment;

determining a set of changes that were made to the existing operating system environment, by a user application, to give rise to the altered operating system environment;

comparing the copy of the altered operating system environment with the copy of the new operating system environment; and upon determining that the copy of the altered operating system environment comprises a set of intervening changes not reflected by the copy of the new operating system environment, changing the new operating system environment to reflect the set of intervening changes comprised in the copy of the altered operating system environment.

14. The computer-readable medium of claim 13, wherein the copy of the existing operating system environment, the copy of the altered operating system environment, and the copy of the new operating system environment are generated dynamically on the computer system.

15. The computer-readable medium of claim 13, wherein the step of determining the set of changes comprises:

comparing the copy of the existing operating system environment with the copy of the altered operating system environment; and generating the set of changes based on differences between the copy of the existing operating system environment and the copy of the altered operating system environment.

16. The computer-readable medium of claim 13, further comprising:

adopting the copy of the new operating system environment if the copy of the new operating system environment reflects intervening changes with respect to the copy of the altered operating system environment.

17. The computer-readable medium of claim 13, further comprising:

in response to comparing the copy of the altered operating system environment with the copy of the new operating system environment, determining that there are no intervening changes between the copy of the altered operating system environment and the copy of the new operating system environment.

18. The computer-readable medium of claim 13, further comprising:

applying the set of changes to the new operating system environment.

19. An apparatus for updating an operating system environment, comprising:

means for creating a copy of an existing operating system environment currently being executed by the apparatus;

means for applying a set of updates to software code implementing the existing operating system environment to derive a new operating system environment;

means for creating a copy of an altered operating system environment which includes changes made to the existing operating system environment after the copy of the existing operating system environment was created;

means for creating a copy of the new operating system environment after the set of updates were applied;

means for rebooting the apparatus to cause the machine to execute the new operating system environment;

means for determining a set, of changes that were made to the existing operating system environment, by a user application, to give rise to the altered operating system environment;

means for comparing the copy of the altered operating system environment with the copy of the new operating system environment; and means for, upon determining that the copy of the altered operating system environment comprises a set of intervening changes not reflected by the copy of the new operating system environment, changing the new operating system environment to reflect the set of intervening changes comprised in the copy of the altered operating system environment.

20. The apparatus of claim 19, wherein the copy of the existing operating system environment, the copy of the altered operating system environment, and the copy of the new operating system environment are generated dynamically on the apparatus.

21. The apparatus of claim 19, further comprising:

means for applying the set of changes to the new operating system environment.

* * * * *